Dec. 31, 1935. A. J. SCHOLTES 2,026,440
BOWING AND TWISTING SLED RUNNERS
Filed June 1, 1935 2 Sheets-Sheet 1
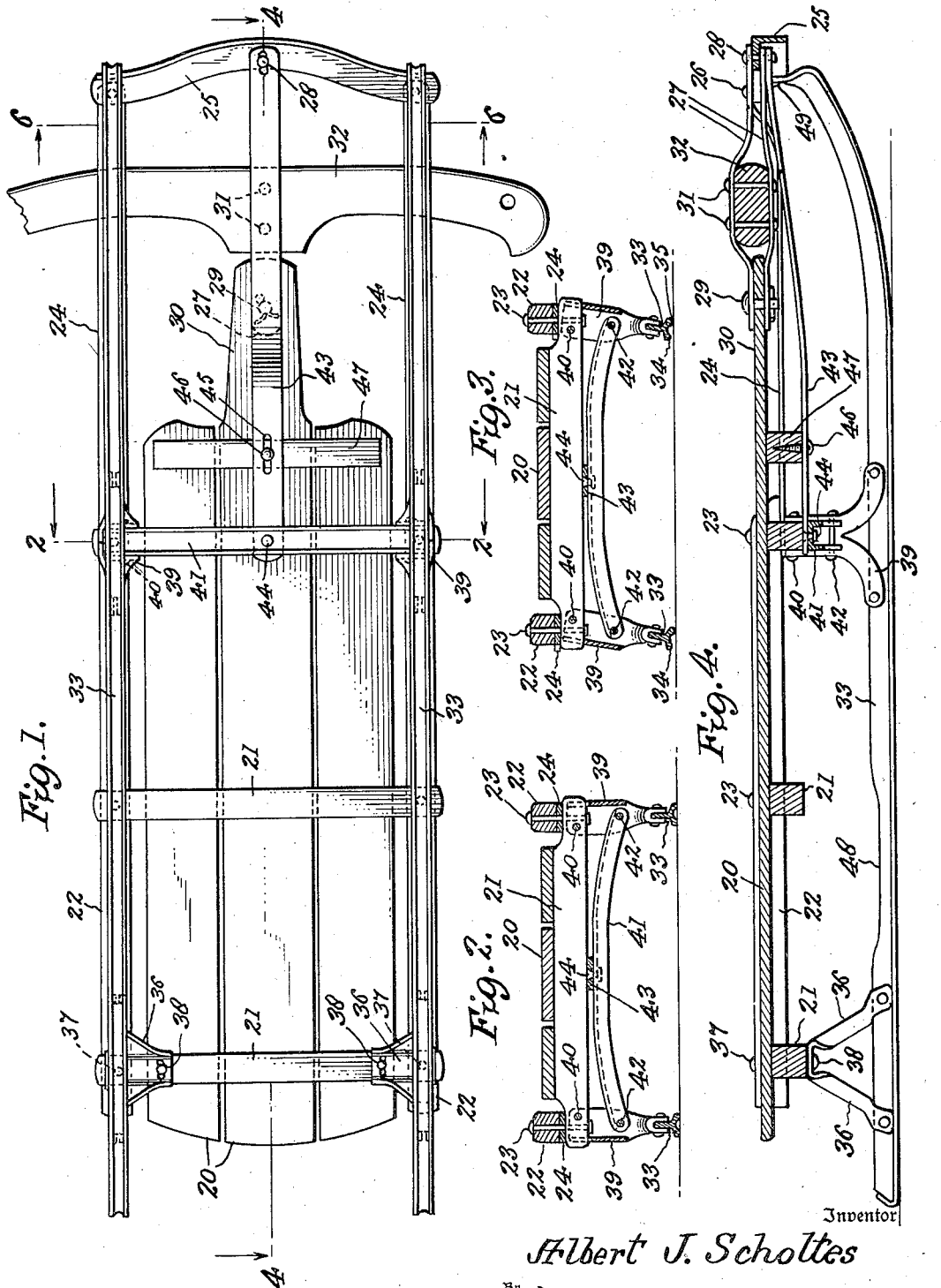
Inventor
Albert J. Scholtes
By Mawhinney & Mawhinney
Attorneys

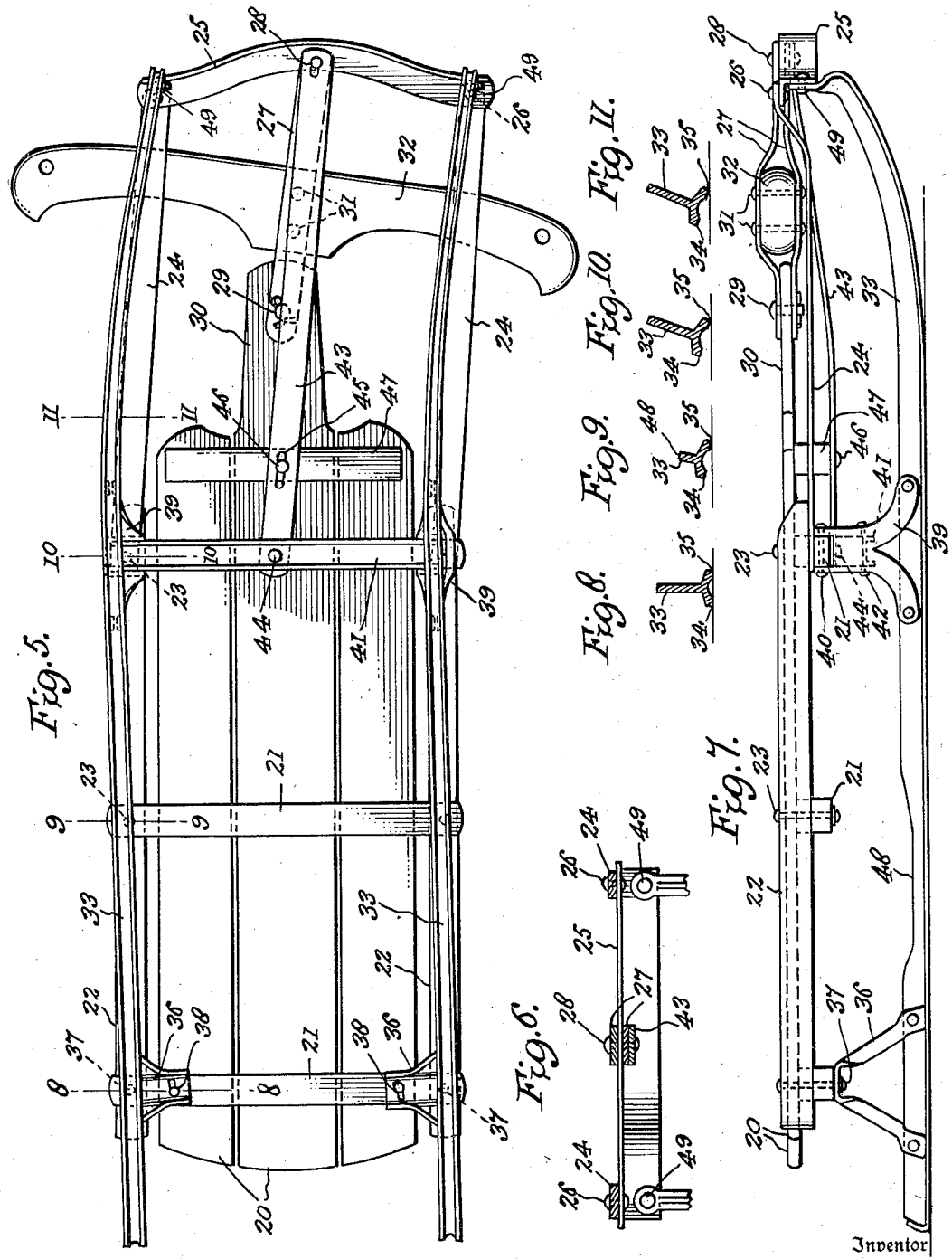

Patented Dec. 31, 1935

2,026,440

UNITED STATES PATENT OFFICE 2,026,440

BOWING AND TWISTING SLED RUNNERS

Albert J. Scholtes, Baltimore, Md.

Application June 1, 1935, Serial No. 24,551

14 Claims. (Cl. 280—22)

The present invention relates to sleds, and more particularly to improved means for steering the same.

An object of the invention is to enable a sled to be turned in a relatively short radius and reduce lateral or radial skidding to a minimum.

Another object of the invention is to accomplish short turning of a sled by not only bowing the runner to the curvature of the turn but also to tilt the runners radially inward and shift the center of gravity of the sled inwardly and to tilt the ground contacting surfaces of the runners and cause the inner lower cutting edges thereof to bite or cut into the ground surface while the upper outer portions of the contacting surfaces are banked against the ice and snow accumulations of the ground.

A further object of the invention is to accomplish these bowing and tilting movements by a simple and inexpensive device including the sled brackets and the transversely disposed steering bar or handle so that practically no additional structural parts are required in the manufacture of the sled.

Another object is to provide a runner with an intermediate portion weakened to torsional strain so, that the rear portion of the runner may be held upright against tilting and the intermediate portion of the runner may be twisted to admit the tilting of the forward end of the runner, whereby the front end of the runner will be held to the path of the curve and the rear end of the runner may freely trail the forward end.

A still further object of the invention is to provide a sled with a pair of runners of the spaced cutting edge ground contacting type wherein the runners may be bowed to make a turn and the forward ends of the runner may be tilted inwardly of the turn to lower and displace inwardly the center of gravity of the sled and to project the inner cutting edges only of said forward ends of the runners against the ground to take the thrust of the weight and radial pressure of the sled and hold the runners from tangential skidding.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a bottom plan view of a sled embodying the features of this invention and in normal straight line adjustment.

Figure 2 is a transverse section taken through the forward end portion of the same on the line 2—2 of Figure 1.

Figure 3 is a like view but with the runners in tilted position for making a turn.

Figure 4 is a longitudinal central section taken on the line 4—4 of Figure 1 of the sled.

Figure 5 is a bottom plan view of the sled similar to Figure 1 but with the parts adjusted to make a turn.

Figure 6 is a fragmentary sectional view taken through the front portion of the sled on the line 6—6 of Figure 1, showing the horizontal runner hinges.

Figure 7 is a side elevation of the sled.

Figure 8 is a detail cross section through the rear end of the runner on the line 8—8 of Figure 5, showing the cutting edges flat on the ground.

Figure 9 is a like view through the torsionally weakened intermediate part of the runner on the line 9—9 of Figure 5, wherein a slight tilting is perceptible.

Figure 10 is another sectional view through the middle portion of the runner on the line 10—10 of Figure 5, showing the increased tilting toward the forward end of the runner, and Figure 11 is a similar view on the line 11—11 of Figure 5, showing the greatest tilting near the upward curving of the runners.

Referring now to the drawings, 20 designates the body portion illustrated in the present embodiment as a slatted platform with spaced cross pieces 21 secured across the bottom of the slats and extending beyond the sides thereof to support raves or side rails 22 in the usual manner. The forward ends of the side rails 22 terminate adjacent the forward cross piece 21 and the rivets 23 of the cross piece comprise pivots for the rear ends of side bars 24 which extend forwardly of the platform and are pivotally interconnected at their forward ends by a front bar 25.

This front bar 25 may be of angle iron cross section with its horizontal flange pivoted by rivets 26 to the front ends of the side bars 24. A swinging link 27, which may comprise a pair of straps as shown, is pivoted at one end to the middle portion of the front bar 25 by a rivet 28 and is slotted to admit a slight longitudinal movement thereof on the pivot 28, and at its other end is secured by a pivot 29 to the forward projection 30 of the middle slat of the body portion 20. The link 27 has fixed across it, by rivets 31, a handle bar 32 which extends laterally beyond the side bars 24 to any practical distance and may be apertured at its ends to receive the usual draft or steering rope.

The sled body has a pair of runners 33 having ground contacting surfaces of the two-point type providing, as shown in Figures 8 to 11 particularly, on each runner spaced cutting edges 34 and 35. The rear portions of the runners 33 are connected to the body by rear brackets 36 seated against the bottom of the rear cross piece 21. Vertical pivots 37 connect the outer portions of the brackets 36 to the cross piece 21 substantially in the vertical planes of respective runners 33 so that the runners and brackets may pivot thereon when the runners 33 are bowed. Headed pins 38 engage through the slotted inner ends of the brackets 36 to hold the latter from tilting and binding on the vertical pivots 37.

Front brackets 39 are secured to the intermediate portions of the runners 33 and are transversely forked or slotted at their upper ends to receive therein the adjacent end portions of the front cross piece 21 and to which the brackets 39 are pivoted by horizontal and longitudinal axis pivots 40. The brackets 39 may therefore swing transversely beneath the body of the sled to not only bow the runners 33 but also to twist the same as the rear portions are held from twisting by the rear brackets 36.

The transversely swinging brackets 39 are interconnected by a tie bar 41, of channel or other suitable form, which is connected at opposite ends to the brackets 39, below their pivots 40, by pivots 42 and which may be arched upwardly toward the front cross piece 21 to provide ample road clearance between the runners.

To transversely shift the tie bar 41 and tilt the brackets 39 an operating lever 43 is connected at its rear end by a pivot 44 to the tie bar 41 and is connected at its forward end to the rivet 28 which extends through a compensating slot in the lever 43. At an intermediate point, preferably near the rear end, the lever 43 has a longitudinal slot 45 through which a body pivot 46 passes and upon which the lever 43 swings for transmitting opposite transverse movements between the front bar 25 and the tie rod 41, the handle 32 and its link 27 being used to effect this movement. The pivot 46 is carried by a pivot strip or block 47 secured across the lower side of the platform 20 to reinforce the same and take up strain imposed on the pivot 46. The swinging brackets 39 may of course be rocked or tilted by any other suitable means.

In order to offer the least resistance to the tilting and twisting of the forward ends of the runners 33, the runners may be weakened to torsional strain near their rear ends between the respective front and rear brackets 39 and 36 by cutting away or reducing the depth of the vertical webs of the runners as shown at 48.

To the same end, the runners 33 are connected at their forward upturned extremities to the depending flange of the front cross bar 25 by horizontal longitudinal axis pivots or hinges 49. The pivots 49 admit the transverse swinging of the forward ends of the runners 33 with the front brackets 39, the twisting of the runners 33 taking place between the front and rear brackets and particularly in the zones of the cut out 48.

In use, when it is desired to make a turn the rider pulls backwardly on the end of the handle 32 toward direction of the turn. As shown in Figure 5, this operation swings the link 27 on its body pivot 29 in the direction of the turn and correspondingly shifts the front cross bar 25.

The side bars 24 also swing on their body pivots 23 and the operating lever 43 is swung on its body pivot 46. This results in the shifting of the tie bar 41 outwardly from the turn and in the outward swinging of the brackets 39. The runners 33 are thus bowed throughout their lengths as the rear brackets 36 turn on their pivots 37 and the forward ends of the runners are anchored to the front cross bar 25. The tilting of the brackets 39 also twists the runners 33 and tilts the forward portions thereof so that, as shown in Figures 8 to 11, the inner cutting edges 35 of the runners are presented downwardly for cutting and biting engagement in the ice and snow and the outer cutting edges 34 are raised to present the bottom faces of the runners against the surface ice and snow to bank the runners and assist in preventing side slipping on the turn.

Further, the tilting of the brackets 39 shifts the center of gravity of the sled inwardly toward the central axis of the curve or turn and slightly lowers the forward end of the sled so that the latter will hold to the turn. The rear ends of the runners 33 are held upright so that the cutting edges 34 and 35 thereof remain at all times flat on the ground as shown in Figure 8 and the rear ends of the runners are free to trail the forward ends thereof and offer practically no resistance to the turning of the sled.

It is to be understood that by the use of "inner cutting edges" and equivalent phrases is meant those edges of the runners, 34 or 35 of each runner, which is on the inner side of the curve along which the sled is traveling, and not one or both of the edges at the base of the central groove in each runner. As shown in Figures 8 to 11 each runner has a wide ground engaging portion with a groove therein dividing it into two spaced apart cutting edges 34 and 35, and each cutting edge itself may be somewhat flattened or broad to provide sharp corners to the edge.

What is claimed is:—

1. A sled, comprising a body portion, a pair of runners hinged horizontally at their forward ends to the body portion and mounted at their rear portions, on vertical pivots on the body portion, and transversely swinging brackets connecting the intermediate portions of the runners to the body portion and adapted to be swung toward the outer side of a curve for bowing the runners to the curve and for tilting the forward and intermediate portions of the runners radially inward to prevent tangential skidding.

2. A sled, comprising a body portion, a pair of hollow ground runners hinged horizontally at their forward ends to the body portion and mounted on vertical pivots at their rear ends to the body portion, and transversely shifting means connected to the intermediate portions of the runners for bowing the same to make a turn and for twisting the runners between the rear vertical pivots and the forward horizontal hinges, whereby to inwardly tilt the bowed hollow ground runners at their forward portions and present their inner cutting edges into biting contact with the ground surface.

3. A sled, comprising a body portion, a pair of rear brackets mounted on vertical pivots on the body portion, a pair of front brackets mounted on horizontal and longitudinal axis pivots on the body portion, a pair of runners carried on the respective front and back brackets and extending forwardly thereof and curved upwardly to the body portion, horizontal longitudinal axis pivots connecting the forward ends of the runners to the body portion, a cross bar interconnecting the forward brackets, and shifting means for the cross bar for transversely moving the same to swing the front brackets transversely of the body portion and bow the runners to one side and twist the runners between the brackets to tilt the ground contacting forward portions of the runners for biting the inner edges thereof into the supporting surface and banking the runners against the ground surface accumulations to hold the sled from side skidding on a turn.

4. A sled, comprising a body portion, a pair of runners pivotally connected to the front and rear ends of the body portion, a pair of intermediate brackets pivoted for transverse swinging movements with respect to the body portion and secured to the runners, a handle bar mounted on the forward end of the body portion and connected to the forward ends of the runners for flexing the same transversely, and a connection between the forward ends of the runners and said intermediate brackets for swinging the latter in the direction opposite to the swinging of the forward ends of the runners to bow the runners and also to longitudinally twist the runners in the zone of the brackets to tilt the runners and effect the edgewise cutting of the runners into the ground surface.

5. A sled, comprising a body portion, a pair of runners, a pair of rear brackets carried by the runners and vertically pivoted to the body portion, horizontal pivots connecting the forward ends of the runners to the body portion, transversely swinging brackets mounted on the body portion and secured to the runners near their forward ends, a tie bar interconnecting said swinging brackets, an operating lever pivoted on the body portion and having one end pivoted to said tie bar, a handle bar mounted across the forward end of the body portion and connected with the forward ends of the runners for flexing the same, said operating lever having its forward end connected with the forward ends of the runners for swinging the operating lever when the forward ends of the runners are flexed to swing said brackets for bowing the runners and twisting and tilting the same.

6. A sled, comprising a body portion, a pair of runners connected at their forward and rear ends to the body portion, bowing means operable on the runners for transversely bowing the same between their connections with the sled body portion, and longitudinal twisting means connected between the runners and the sled body portion and operable by the bowing of the runners to lengthwise twist the same and cant the ground contacting surfaces of the runners for banking the latter and supporting the runners at one edge of the ground contacting surfaces.

7. A sled, comprising a body portion, a pair of runners mounted on the body portion and having ground contacting surfaces, bowing means disposed between the runners and the sled body portion for transversely curving the runners to guide the sled through a turn, and a tilting connection between the runners and the sled body portion operable upon the curving of the runners to twist the same longitudinally and tilt portions of the ground contacting surfaces of the runners to bite one edge of said surfaces into the ground and bank the runners for the turn.

8. A sled, comprising a body portion, a pair of runners mounted on the body portion and having ground contacting surfaces, transverse bowing means between the runners and the sled body portion for curving the runners transversely to guide the sled, and tilting connections between the runners and the sled body portion operable by the curving of the runners to tilt said ground contacting surfaces over on one edge thereof and shift the center of gravity radially inward for banking the runners.

9. A sled, having a body portion, a flexible runner for the body portion provided with an intermediate portion weakened to torsional strain and adapted to be transversely bowed for steering the sled, an upright bracket connecting the rear portion of the runner to the body portion for holding the rear portion of the runner against tilting, and a transversely swinging bracket carried by the body portion and connected to the forward portion of the runner for longitudinally twisting the runner forwardly of said intermediate weakened portion and tilting the said forward portion relatively to the said rear portion of the runner when the latter is bowed.

10. A sled having a body portion, a runner for the body portion provided with an intermediate section weakened to torsional strain, a bracket for anchoring the rear section of the runner from tilting on the rear part of the body portion, a guiding member on the body portion connected to the runner for bowing the same to guide the sled, and tilting means for the forward section of the runner operable when the runner is bowed to twist the runner forwardly of said weakened intermediate section and tilt the forward section of the runner relatively to the rear section thereof.

11. In a sled, a body portion, a runner for the body portion having a ground contacting portion with spaced apart cutting edges, securing means between the body portion and the rear section of the runner for holding the spaced cutting edges of the latter in contact with the ground, a guiding device connected between the body portion and the runner for bowing the latter transversely to steer the sled, and longitudinal twisting means between the body portion and the forward section of the runner and operable when the runner is bowed to tilt the same and cause it to bear at one cutting edge on the ground surface.

12. In a sled, a body portion, a runner for the body portion having spaced cutting edges for contact with the ground, bowing means between the body portion and the runner for bowing the latter to make a turn, and longitudinal twisting means between the body portion and the runner for tilting a portion of the runner when bowed to cause said portion of the runner to be supported on one only of said cutting edges.

13. A sled, comprising a body portion, a pair of runners, rear brackets secured to the runners and mounted by vertical pivots on the body portion to admit turning of the brackets and bowing of the runners, a front cross bar connected by longitudinal pivots to the forward ends of said runners, a link pivotally mounted on the body portion at one end and pivotally connected to said front cross bar at its other end and having a handle bar rigidly secured across the link, a pair of brackets hinged to the body portion for transverse swinging therebeneath and secured to the runners near their forward ends, a tie bar interconnecting said hinged brackets, and an operating lever pivotally mounted on the body portion with its forward end connected to said front cross bar and its rear end connected to said tie bar for transversely bowing the forward and intermediate portions of the runners in opposite directions, said hinged brackets adapted to longitudinally twist the runners when bowed to bank the same and tilt the ground engaging surfaces of the runners.

14. A sled, comprising a body, a pair of flexible runners, a pair of rear brackets pivoted vertically to the sled body and secured to the rear portions of the runners and adapted to turn when the runners are bowed, a front cross bar connected by longitudinal pivots to the forward ends of the runners to admit transverse swinging of the latter beneath the bar, a link pivoted between the sled body and the front cross bar and having an operating member for swinging the link and shifting the cross bar transversely of the sled body, an operating lever pivoted intermediately on the sled body and pivoted at its forward end to the front cross bar to swing therewith, a tie bar pivotally connected to the rear end of said operating lever to move therewith in a direction opposite to the movement of the front cross bar, and a pair of brackets hinged by longitudinal pivots to the intermediate portion of the sled body and secured to the adjacent portion of the runners and having connection with the opposite ends of the tie bar, whereby shifting of the front cross bar in one direction effects the swinging of the brackets in an opposite direction and bows the runners with pressure at spaced points and whereby said swinging brackets also longitudinally twist the runners and tilt the same with the brackets and about their longitudinal pivotal connections with the front cross bar to bank the runners against the direction of bowing.

ALBERT J. SCHOLTES.